United States Patent
Hilnbrand et al.

(10) Patent No.: US 10,289,115 B2
(45) Date of Patent: May 14, 2019

(54) AUTOMATED VEHICLE MAP LOCALIZATION BASED ON OBSERVED GEOMETRIES OF ROADWAYS

(71) Applicant: Aptiv Technologies Limited, St. Michael (BB)

(72) Inventors: Brian R. Hilnbrand, Mountain View, CA (US); Paul Robert, San Jose, CA (US)

(73) Assignee: Aptiv Technologies Limited (BB)

( * ) Notice: Subject to any disclaimer, the term of this patent is extended or adjusted under 35 U.S.C. 154(b) by 65 days.

(21) Appl. No.: 15/611,337

(22) Filed: Jun. 1, 2017

(65) Prior Publication Data

US 2018/0348762 A1 Dec. 6, 2018

(51) Int. Cl.
G05D 1/00 (2006.01)
G01C 21/30 (2006.01)
G05D 1/02 (2006.01)

(52) U.S. Cl.
CPC ........... G05D 1/0088 (2013.01); G01C 21/30 (2013.01); G05D 1/027 (2013.01); G05D 1/0231 (2013.01); G05D 1/0246 (2013.01); G05D 1/0257 (2013.01); G05D 1/0274 (2013.01); G05D 1/0278 (2013.01)

(58) Field of Classification Search
CPC .. G05D 1/0088; G05D 1/0231; G05D 1/0246; G05D 1/0257; G05D 1/027; G05D 1/0274; G05D 1/0278; G01C 21/30; G01C 21/32; G01C 21/28; G06T 2207/30248; G06T 2207/30256; G06T 2207/30261

USPC ........................ 701/23, 450, 461, 532, 533
See application file for complete search history.

(56) References Cited

U.S. PATENT DOCUMENTS

| | | | |
|---|---|---|---|
| 9,207,088 B2 * | 12/2015 | Firl | G01C 21/32 |
| 9,435,653 B2 * | 9/2016 | Zeng | B60W 30/0956 |
| 9,562,778 B2 * | 2/2017 | DuHadway | G01C 21/28 |
| 9,625,264 B1 * | 4/2017 | Imanishi | G01C 21/3638 |
| 9,933,268 B2 * | 4/2018 | Bagheri | G01C 21/32 |
| 9,939,813 B2 * | 4/2018 | Shashua | G01C 21/32 |
| 2003/0069688 A1 | 4/2003 | Mosis | |
| 2008/0021638 A1 * | 1/2008 | Kobayashi | G01C 21/30 701/532 |
| 2008/0036626 A1 * | 2/2008 | Kim | G01C 21/3658 340/995.14 |
| 2008/0243378 A1 * | 10/2008 | Zavoli | G01C 21/28 701/533 |
| 2011/0221585 A1 * | 9/2011 | Higuchi | G01C 21/3697 340/438 |
| 2011/0320156 A1 * | 12/2011 | Oohashi | G01C 21/165 702/95 |

(Continued)

FOREIGN PATENT DOCUMENTS

EP 1 906 339 A1 4/2008

Primary Examiner — Richard A Goldman
(74) Attorney, Agent, or Firm — Lawrence D Hazelton

(57) ABSTRACT

A map-localization system for navigating an automated vehicle includes a path-detector, a digital-map, and a controller. The path-detector is used to detect observed-geometries of a roadway traveled by a host-vehicle. The digital-map indicates mapped-geometries of roadways available for travel by the host-vehicle. The controller is in communication with the path-detector and the digital-map. The controller is configured to determine a location of the host-vehicle on the digital-map based on a comparison of the observed-geometries to the mapped-geometries.

3 Claims, 2 Drawing Sheets

(56) References Cited

U.S. PATENT DOCUMENTS

| | | | |
|---|---|---|---|
| 2012/0271540 A1* | 10/2012 | Miksa | G01C 21/30 |
| | | | 701/409 |
| 2013/0162824 A1 | 6/2013 | Sung et al. | |
| 2014/0088862 A1 | 3/2014 | Simon | |
| 2015/0142306 A1* | 5/2015 | Kanematsu | G01C 21/30 |
| | | | 701/461 |
| 2015/0233720 A1 | 8/2015 | Harada | |
| 2016/0003630 A1* | 1/2016 | Higuchi | G08G 1/056 |
| | | | 701/41 |
| 2016/0153802 A1* | 6/2016 | Sato | G01C 21/3626 |
| | | | 701/526 |
| 2016/0167656 A1* | 6/2016 | Matsuda | B60W 50/0097 |
| | | | 701/70 |
| 2016/0273934 A1* | 9/2016 | Seko | G01C 21/3635 |
| 2017/0016731 A1* | 1/2017 | Koshiba | G09B 29/106 |
| 2017/0059351 A1* | 3/2017 | Kawamukai | G01C 21/3461 |
| 2017/0124880 A1* | 5/2017 | Tateishi | B60W 30/12 |
| 2017/0137025 A1* | 5/2017 | Muto | G01C 21/26 |
| 2017/0206787 A1* | 7/2017 | Ando | G08G 1/161 |
| 2017/0267248 A1* | 9/2017 | Harda | B60W 30/12 |
| 2018/0120115 A1* | 5/2018 | Shikimachi | G01C 21/165 |
| 2018/0165525 A1* | 6/2018 | Hamada | G01C 21/30 |

* cited by examiner

AUTOMATED VEHICLE MAP LOCALIZATION BASED ON OBSERVED GEOMETRIES OF ROADWAYS

TECHNICAL FIELD OF INVENTION

This disclosure generally relates to a map-localization system for navigating an automated vehicle, and more particularly relates to a system that determines a location of a host-vehicle on a digital-map based on a comparison of observed-geometries observed by the host-vehicle to the mapped-geometries indicated on a digital-map.

BACKGROUND OF INVENTION

It is known to determine a location of an automated vehicle on a digital-map using coordinates provided by a satellite based global-positioning-system (GPS). However, if the GPS receiver is inoperable or signals from the satellites are not received, there needs to be a backup method of determining the location on a digital-map.

SUMMARY OF THE INVENTION

In the field of biometrics and forensic science, minutiae are major features of a fingerprint that can be used to match fingerprints. The minutiae include: Ridge ending—the abrupt end of a ridge; Ridge bifurcation—a single ridge that divides into two ridges; Short ridge, or independent ridge—a ridge that commences, travels a short distance and then ends; Island—a single small ridge inside a short ridge or ridge ending that is not connected to all other ridges; Ridge enclosure—a single ridge that bifurcates and reunites shortly afterward to continue as a single ridge; Spur—a bifurcation with a short ridge branching off a longer ridge; Crossover or bridge—a short ridge that runs between two parallel ridges; Delta—a Y-shaped ridge meeting; and Core—a U-turn in the ridge pattern. If a GPS receiver in an automated vehicle is inoperable or otherwise not receiving signals from satellites, it is proposed that a navigation system can observe various features of a roadway and/or objects proximate to the roadway to determine a location on a digital map using a matching technique similar to that used to match fingerprints.

In accordance with one embodiment, a map-localization system for navigating an automated vehicle is provided. The system includes a path-detector, a digital-map, and a controller. The path-detector is used to detect observed-geometries of a roadway traveled by a host-vehicle. The digital-map indicates mapped-geometries of roadways available for travel by the host-vehicle. The controller is in communication with the path-detector and the digital-map. The controller is configured to determine a location of the host-vehicle on the digital-map based on a comparison of the observed-geometries to the mapped-geometries.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
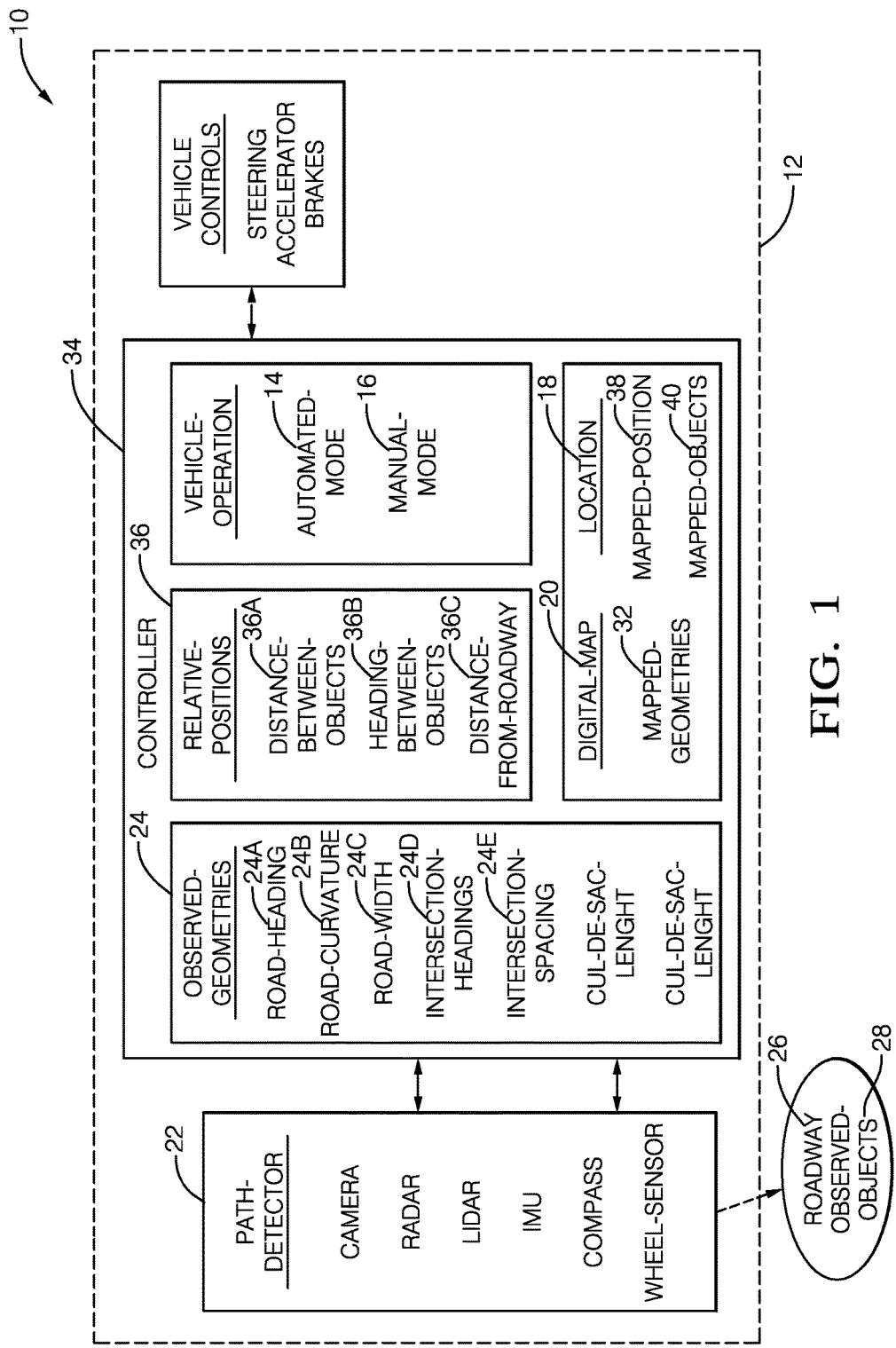
FIG. 1 is a diagram of a map-localization system in accordance with one embodiment.

FIG. 1 illustrates a non-limiting example of a map-localization system 10, hereafter referred to as the system 10. As will become evident in the description that follows, the system 10 is especially well adapted for navigating an automated vehicle (e.g. a host-vehicle 12) when map-localization using a satellite based global-positioning-system (GPS) is unavailable. That is, the system 10 is able to determine a location 18 on a digital-map 20 when the coordinates (e.g. latitude and longitude) of the host-vehicle 12 are not available from a GPS-receiver.

As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing audible and/or visual navigation information (e.g. turn-by-turn directions to a destination) to the human-operator who is generally in control of the steering, accelerator, and brakes of the host-vehicle 12.

The system 10 includes a path-detector 22 used to detect observed-geometries 24 of a roadway 26 (see also FIG. 2) traveled by a host-vehicle 12. The path-detector 22 may include, but is not limited to, a camera, a lidar, and/or a radar preferably mounted on the host-vehicle 12 and oriented to detect the roadway or other instances of observed-objects 28 proximate to (e.g. within 100 meters of) the host-vehicle 12. The path-detector 22 may also include an inertial-measurement-unit (IMU) that detects relative motion of the host-vehicle 12 using various accelerometers, a compass that indicates a heading of the host-vehicle 12, and/or a wheel-sensor used to measure linear distance traveled by the host-vehicle 12. While any combination of the various devices that make-up or form the path-detector 22 could be located in an integrated housing, this is not a requirement as it is contemplated that the various devices could be mounted on the host-vehicle at a variety of locations. Suitable examples of the aforementioned devices are commercially available for installation on the host-vehicle 12, as will be recognized by those in the art.

Figure 2:
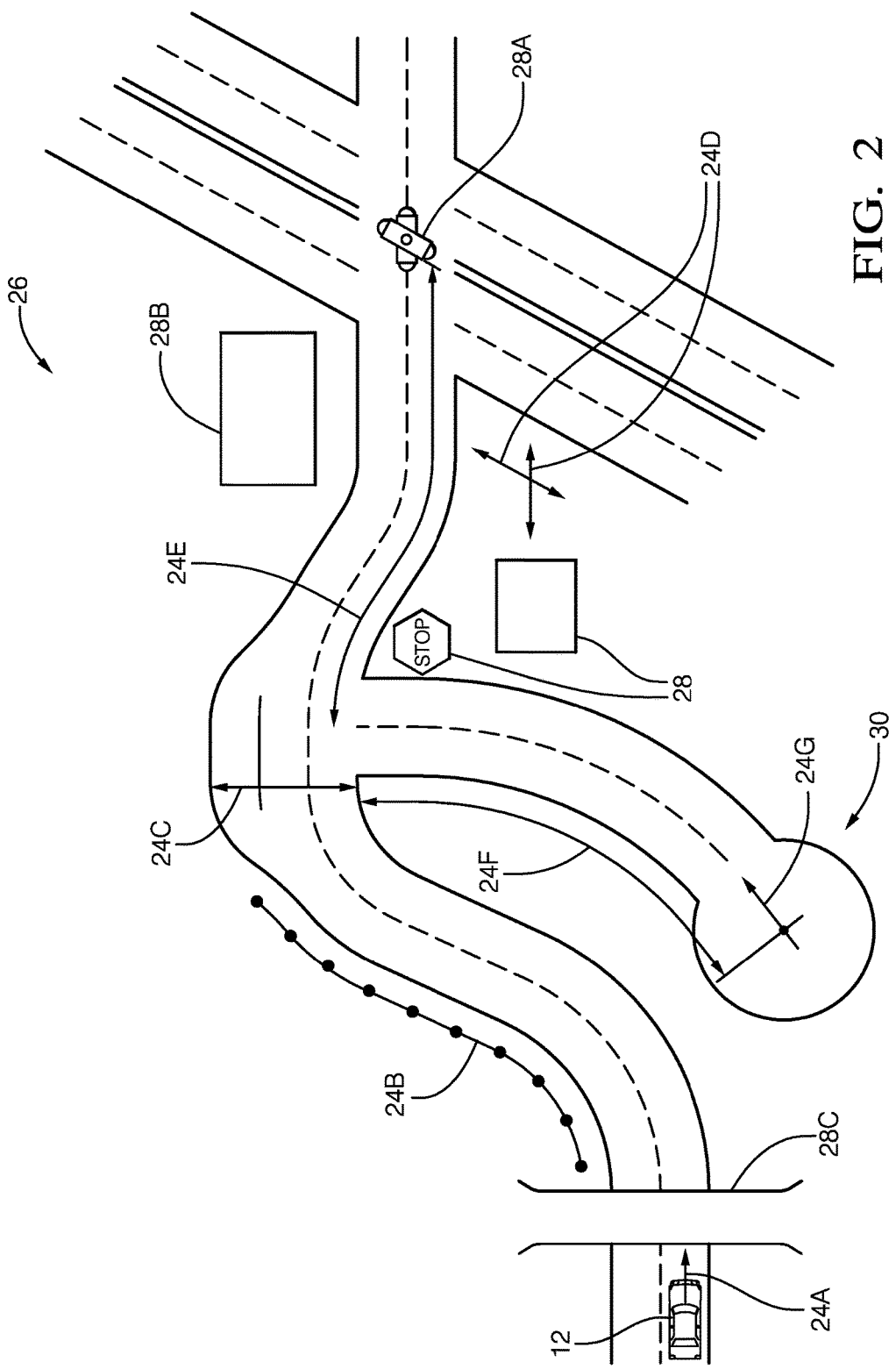
FIG. 2 is an illustration of roadway features that are used by the system of FIG. 1 to determine a location on a digital-map in accordance with one embodiment.

FIG. 2 illustrates a non-limiting example of the roadway 26 traveled by the host-vehicle 12. In the event that the host-vehicle 12 is in some situation where the host-vehicle 12 is unable to determine the location 18 of the host-vehicle 12 using GPS-coordinates, the host-vehicle 12 will start following the roadway 26 and gather the observed-geometries 24 using the path-detector 22. By way of example and not limitation, the observed-geometries 24 may include a road-heading 24A that may be indicated by a compass of the path-detector 22. A change over time of the road-heading 24A and/or images from a camera of the path-detector 22 and/or data from the IMU may be used to determine a road-curvature 24B of the roadway 26. The road-curvature 24B may be represented by an equation such as a polynomial, or represented by a series of radii of segments of the roadway 26 along a curve. Instances where the roadway 26 has a complicated curvature, e.g. not a continuous radius and not turning on only one direction, are useful to determine the location 18 of the host-vehicle 12 on the digital-map 20.

By way of further non-limiting examples of the observed-geometries 24, the camera and/or the lidar may be used to determine a road-width 24C of the roadway 26. Instances where the roadway 26 transitions, for example, to three-lane from two-lanes as suggested where the road-width 24C is indicated in FIG. 2 may also be used to determine the location 18 of the host-vehicle 12 on the digital-map 20. Furthermore, instances of multi-lane roadways (e.g. more than one-lane in opposite directions) are useful to determine the location 18 of the host-vehicle 12 on the digital-map 20.

By way of further non-limiting examples of the observed-geometries 24, the compass in combination with the camera and/or lidar may be used to determine the value of intersection-headings 24D that indicate the orientation of roadways at an intersection. Instances where the roadways at an intersection are not at right-angles, and/or instances where the compass headings of the roadways at an intersection are not aligned with the north/south or east/west compass headings are useful to determine the location 18 of the host-vehicle 12 on the digital-map 20. The wheel-sensor of the path-detector 22 in combination with the camera and/or lidar may be used to determine an intersection-spacing 24E, i.e. distance between two intersections, which may be used in any combination of the observed-geometries 24 to determine the location 18.

The system 10 may steer the host-vehicle 12 to always make right turns until the location 18 is determined, unless the system 10 detects that the host-vehicle 12 is traveling in a 'circle' using the IMU. However, as suggested in FIG. 2, the host-vehicle 12 may encounter a cul-de-sac 30. By using various devices of the path-detector 22, the system may be able to determine a cul-de-sac-length 24F, and/or a cul-de-sac-heading 24G, i.e. the compass direction of the roadway 26 at the cul-de-sac 30.

Referring again to FIG. 1, the system 10 includes or has access to a digital-map 20 that indicates mapped-geometries 32 of roadways available for travel by the host-vehicle 12. While FIG. 2 is intended to depict an actual example of the roadway 26 detected by the path-detector 22, FIG. 2 can also be view as representative of the contents of the digital-map 20 that indicates the mapped-geometries 32. That is, information stored in the digital-map 20 may include mapped-geometries 32 that may correspond to, but is not limited to, examples of the observed-geometries 24 such as the road-heading 24A, the road-curvature 24B, the road-width 24C, the intersection-headings 24D, the intersection-spacing 24E, the cul-de-sac-length 24F, and/or the cul-de-sac-heading 24G. Accordingly, a separate drawing for the digital-map 20 that shows the mapped geometries 32 is unnecessary. While the digital-map 20 is shown as being within the host-vehicle 12, this is not a requirement. It is contemplated the digital-map 20 may be stored 'in the cloud' and accessed by the system 10 using various communication means such as a cellular-phone network and/or Wi-Fi. It is also contemplated that rather than the map data being downloaded to the vehicle to determine the location 18, the mapped-geometries can be uploaded to a remote processing server (which contains the map data) to determine and send back the location 18 to the host-vehicle 12.

The system includes a controller 34 in communication with the path-detector 22 and the digital-map 20. Communication with the path-detector 22 and the digital-map 20 may be by way of wires, optical cable, or wireless communication as will be recognized by those in the art. The controller 34 may include a processor (not specifically shown) such as a microprocessor or other control circuitry such as analog and/or digital control circuitry including an application specific integrated circuit (ASIC) for processing data as should be evident to those in the art. The controller 34 may include memory (not specifically shown), including non-volatile memory, such as electrically erasable programmable read-only memory (EEPROM) for storing one or more routines, thresholds, and captured data. The one or more routines may be executed by the processor to perform steps for determining the location 18 on the digital-map based on signals received by the controller 34 from the path-detector 22 as described herein.

In order to overcome the aforementioned problems of determining the location 18 on the digital-map 20 when map-localization using a satellite based global-positioning-system (GPS) is unavailable, the controller 34 is configured to determine the location 18 of the host-vehicle 12 on the digital-map 20 based on a comparison of the observed-geometries 24 to the mapped-geometries 32. That is, the controller 34 seeks to match a 'fingerprint' of the roadway 26 determined with data from the path-detector to a 'fingerprint' indicated by a portion of the digital-map 20. The fingerprint of the roadway 26 that is indicated by the observed-geometries 24 is matched to the digital-map 20 in much the same way as a fingerprint from a crime scene is matched to a fingerprint database maintained by law-enforcement.

It is noted that the host-vehicle 12 will typically be at the most recent value of the location 18 when the system 10 is activated, so the most-recent value of the location 18 will be used to start the search to match the 'fingerprint' of the roadway 26 to the digital-map 20. However, it is contemplated that the host-vehicle 12 may have been towed or shipped to a new location that does not correspond to any prior instance of the location 18 determined by the system 10. That is, the system 10 is configured to determine the location 18 without any prior information about the location 18.

In addition to determining the observed-geometries 24 of the roadway 26, some or all of the devices of the path-detector 22 may be used to detect the relative-positions 36 of the observed-objects 28 that may include, for example, a traffic-signal 28A (FIG. 2), a building 28B, and/or a bridge 28C (i.e. an overpass over the roadway 26), or any other object proximate to the roadway 26. By way of example and not limitation, the relative-positions 36 of the observed-objects 28 may be characterized by a distance-between-objects 36A, a heading-between-objects 36B, and a distance-from-roadway 36C. It is contemplated that the relative-position of an object may be determined relative to a feature of the roadway 26, e.g. an intersection. Accordingly, the digital-map 20 may be advantageously configured to indicate mapped-positions 38 of mapped-objects 40 proximate to the roadways available for travel by the host-vehicle 12. Similar to that described above with regard to the mapped-geometries 32, the mapped-objects 40 stored in the digital-map 20 are similar enough to the observed-objects 28 illustrated in FIG. 2 that it is unnecessary to provide a separate drawings to show examples of the observed-objects 28.

It follows that the controller 34 may be further configured to determine the location 18 of the host-vehicle 12 on the digital-map 20 based on a comparison of the relative-positions 36 (determined using information from the path-detector 22) to the mapped-positions 38 (indicated in the digital-map 20).

Accordingly, a map-localization system (the system 10), a controller 34 for the system 10, and a method of operating the system 10 is provided. The system 10 addresses or overcomes the problem of navigating the host-vehicle 12 in accordance with a digital-map 20 when coordinates determined from GPS satellites are not available because, for example, a GPS-receiver (not shown) of the host-vehicle 12 is not operating.

While this invention has been described in terms of the preferred embodiments thereof, it is not intended to be so limited, but rather only to the extent set forth in the claims that follow.

We claim:

1. A map-localization system for navigating an automated vehicle, said system comprising:
 a path-detector that detects observed-geometries of a roadway traveled by a host-vehicle, wherein the observed-geometries include road-heading, road-curvature, road-width, intersection-headings, intersection-spacing, cul-de-sac-length, and cul-de-sac-heading;
 a digital-map that indicates mapped-geometries of roadways available for travel by the host-vehicle; and
 a controller in communication with the path-detector and the digital-map, said controller configured to determine a location of the host-vehicle on the digital-map based on a comparison of the observed-geometries to the mapped-geometries.

2. The system in accordance with claim 1, wherein the path-detector detects relative-positions of observed-objects, the digital-map indicates mapped-positions of mapped-objects proximate to the roadways available for travel by the host-vehicle, and the controller is further configured to determine the location of the host-vehicle on the digital-map based on a comparison of the relative-positions to the mapped-positions.

3. The system in accordance with claim 2, wherein the relative-positions of the observed-objects are characterized by a distance-between-objects, a heading-between-objects, and a distance-from-roadway.

\* \* \* \* \*